United States Patent
Cai et al.

(10) Patent No.: US 10,415,984 B2
(45) Date of Patent: Sep. 17, 2019

(54) MEASURING THE ACCURACY OF MAP MATCHED TRAJECTORIES

(71) Applicant: Uber Technologies, Inc., San Francisco, CA (US)

(72) Inventors: Xiao Cai, San Bruno, CA (US); Shijing Yao, El Cerrito, CA (US); Thi Duong Nguyen, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 107 days.

(21) Appl. No.: 15/895,988

(22) Filed: Feb. 13, 2018

(65) Prior Publication Data

US 2019/0204096 A1    Jul. 4, 2019

Related U.S. Application Data (60) Provisional application No. 62/612,190, filed on Dec. 29, 2017.

(51) Int. Cl.
*G01C 21/34* (2006.01)
*G01C 21/32* (2006.01)
*G06F 19/00* (2018.01)

(52) U.S. Cl.
CPC ......... *G01C 21/3446* (2013.01); *G01C 21/32* (2013.01)

(58) Field of Classification Search
USPC ........................................................ 701/417
See application file for complete search history.

(56) References Cited

U.S. PATENT DOCUMENTS

| | | | | |
|---|---|---|---|---|
| 9,359,018 | B2* | 6/2016 | Lagassey | G07C 5/008 |
| 2015/0300827 | A1* | 10/2015 | Malalur | G01C 21/30 |
| | | | | 701/410 |
| 2017/0257474 | A1* | 9/2017 | Rhoads | G01C 21/20 |
| 2018/0182238 | A1* | 6/2018 | Fowe | G08G 1/0129 |

OTHER PUBLICATIONS

Krumm, J., "Hidden Markov Map Matching Through Noise and Sparseness," 17th ACM SIGSPATIAL International Conference on Advances in Geographic Information Systems (ACM SIGSPATIAL GIS 2009), Nov. 4-6, 2009, Microsoft Research, [Online] [Retrieved on Nov. 14, 2017] Retrieved from the Internet<URL: https://www.microsoft.com/en-us/research/publication/hidden-markov-map-matching-noise-sparseness/>.

* cited by examiner

*Primary Examiner* — Tan Q Nguyen
(74) *Attorney, Agent, or Firm* — Fenwick & West LLP (57) ABSTRACT

A transport service system determines the accuracy of a map matched trajectory using a forward probability algorithm. A transport vehicle on a trip relays location data to the system. The system uses a map of the corresponding area and the location data to calculate an emission probability, the likelihood of a candidate road being associated with a location data point, and a transition probability, the likelihood of a second state occurring after a first state. The joint probability of the emission and transition probabilities is used to determine a total number of zero forward probability occurrences and an average forward probability associated with the trip. These metrics are used to measure the accuracy of the map matching algorithm for the trip.

18 Claims, 7 Drawing Sheets

MEASURING THE ACCURACY OF MAP MATCHED TRAJECTORIES

BACKGROUND

This disclosure relates generally to map matched vehicle trajectories, and more specifically to measuring the accuracy of map matched trajectories.

A transport service system evaluates the accuracy of map matching processes used to determine the most likely trajectory of a transport vehicle. Map matching is the process in which raw location signals, such as global positioning satellite (GPS) coordinates, are "snapped" to the underlying road segments. That is, for a given location signal or for a series of location signals, the map matching process attempts to identify a position on a road or road segment given the map data corresponding to the location signal. The transport service system uses the map matched road or road segments to determine transit information, such as the on-route distance of a trip or identifying the location of a vehicle for routing to a destination.

The map matching process may incorrectly identify the road segments actually traveled by a vehicle for a variety of reasons. First, the location signals are typically derived from sensors on a vehicle, which may be affected by interference from buildings, vehicles, weather, and other circumstances which affect the precision of the location signals. Second, the map data used by the transport service system typically associates location coordinates (such as a specific latitude and longitude) with the various road segments. In some cases, the map data may include incorrect location coordinates for a road segment that does not reflect the true coordinates of that road segment in the world. The map data may describe roads that do not actually exist, or there may be existing roads that are not captured by the map data. In addition, the map matching process itself for selecting possible road segments may poorly reflect the actual roads traveled by a vehicle.

SUMMARY

To measure the effectiveness of the map matching for a series of location signals, one example approach uses a forward probability algorithm of a Hidden Markov Model to calculate the likelihood of aligning the current GPS signal to each road segment given the current and previous GPS locations. Supervised or unsupervised metrics can be generated from the location signals and the matched route depending on whether the ground truth is known.

When the true location of the transport vehicle, called the "ground truth," is known during a trip, the accuracy of the map matching process may be evaluated by directly comparing the map matched results to the ground truth. This method is considered a "supervised" metric. Trips on which the ground truth is known require that the transport vehicle be equipped with a high precision location tracking device. Supervised metrics allow the system to determine trajectory similarity, which measures the geometry similarity between the ground truth trajectory and the map matched results, and route adherence, which measures the closeness between the map matched suggested route and the true route.

When the true location of the transport vehicle is not known, an "unsupervised" metric for the accuracy of the map matching process is evaluated using a forward probability algorithm. This unsupervised metric can be determined based on the location signal data and the map matched results. The forward probability algorithm of the Hidden Markov Model uses a sequence of location signal data sampled at a given frequency and calculates an emission and transition probability between road segments from the signal data. The emission probability is determined based on the likelihood that, for a given candidate road (or road segment), the observed GPS signal would occur. The transition probability is determined based on probability that transferring to a road segment candidate corresponding to a second observed location signal given the occurrence of the road segment candidate of the previous observed location signal. The joint probability of the emission and transition probabilities are then used to calculate the total number of zero forward probability and the average forward probability, from which the system determines the accuracy of the map matching. A zero forward probability occurs at points on a map matched route where the roads determined to be the most likely path are determined by map data to be physically or legally impossible. For example, a most likely path that moves from one road to another may be "impossible" if the map data indicates no connecting road or intersection to allow the transition to the second road, and thus result in a zero forward probability at that location. In another example, a zero forward probability may occur if the forward probability from a given state to another state is nonzero, but less than a threshold probability determined to be unlikely to occur.

These metrics can be used to improve the map matching performance and the metrics of the downstream services. For example, the metrics can be used to determine the accuracy of map matching algorithms or map data used to generate the map matched route. In another example, because the unsupervised metric is based on map data, a repeated zero forward probability associated with a given area may indicate a flaw in the map data.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

(a) System Architecture

Figure 1:
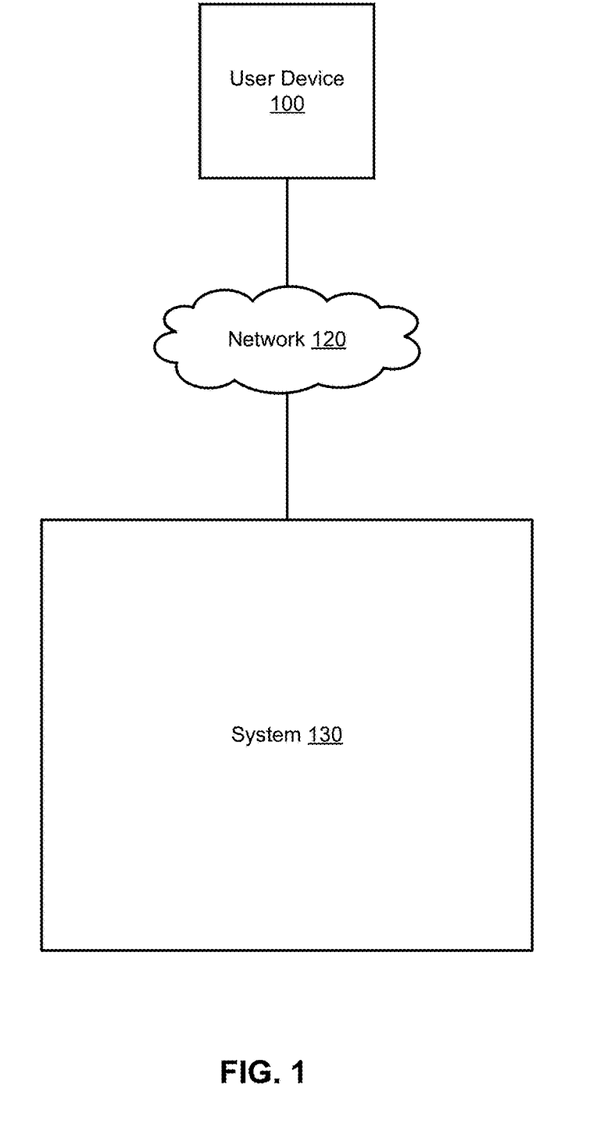
FIG. 1 is a block diagram of a system environment for an online system, in accordance with an embodiment.

FIG. 1 is a high-level block diagram of a system environment for a system 130, in accordance with some embodiments. FIG. 1 includes a user device 100, a network 120, and the system 130. For clarity, only one user device 100 is shown in FIG. 1. Alternate embodiments of the system environment can have any number of user devices 100 as well as multiple systems 130. The functions performed by the various entities of FIG. 1 may vary in different embodiments. The system 130 may provide routing, direction, and timing information to the user device 100. In some embodiments, the system 130 may coordinate travel, for example, by matching a rider with a provider who can transport the rider, items, or services to a destination requested by a rider.

In some embodiments, the system 130 determines a map matched route from a current or completed trip, the map matched route representing a likely trajectory of travel taken by the transport vehicle. The system 130 uses a forward probability algorithm of the Hidden Markov Model to determine the average forward probability and the number of zero forward probability points associated with the map matched route. The system 130 then uses the average forward probability and number of zero forward probability points as a metric to determine the accuracy of the map matched route to the actual route taken by the transport vehicle. This forward probability algorithm may be unsupervised, and can be automatically generated given map data for a region and the vehicle's reported location data from location sensors. These metrics may be applied in a number of downstream processes to evaluate the performance of the map matching algorithm and identify inaccuracies in the mapping data itself.

Providers and riders may interact with the system 130 through user devices 100. User devices 100 can be personal or mobile computing devices, such as smartphones, tablets, or notebook computers. In some embodiments, the user device 100 executes a client application that uses an application programming interface (API) to communicate with the system 130 through the network 120. A current location of a user device 100 may be designated by a user or detected using a location sensor of the user device 100 (e.g., a global positioning system (GPS) receiver).

User devices 100 may interact with the system 130 through client applications configured to interact with the system 130. The client applications of the user devices 100 can present information received from the system 130 on a user interface, such as a map of the geographic region, the current location of the user device 100, and estimated trip duration. The client application on the user device 100 may be able to determine the current location and provide the current location to the system 130. The user device 100 may provide its "location" as a coordinate, for example as provided by the location sensor on the user device 100. The system 130 may use the location coordinates provided by the user device 100 to determine a specific location with respect to a map and a road or road segment corresponding to the locations provided by the user device 100.

The user devices 100 can communicate with the system 130 via the network 120, which may comprise any combination of local area and wide area networks employing wired or wireless communication links. In some embodiments, all or some of the communication on the network 120 may be encrypted.

Figure 2:
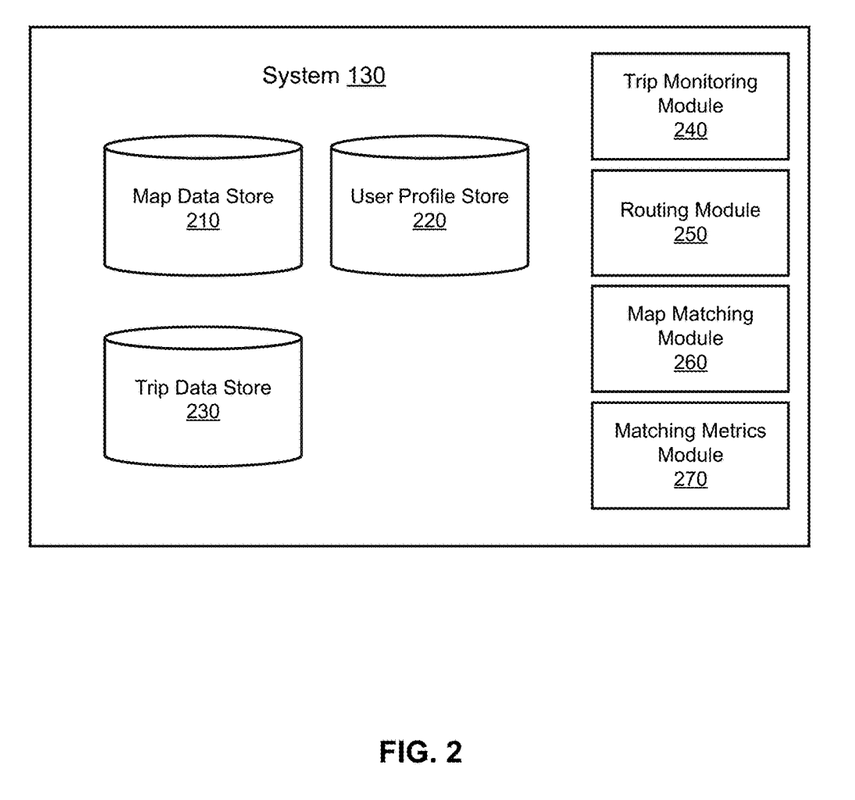
FIG. 2 is a block diagram of an architecture of the online system, in accordance with an embodiment.

FIG. 2 is a block diagram of a system architecture for the system 130, in accordance with some embodiments. The system 130 includes various modules and data stores to measure the accuracy of map matched trajectories. The system 130 comprises a map data store 210, a user profile store 220, a trip data store 230, a trip monitoring module 240, a routing module 250, a map matching module 260, and a matching metrics module 270. Computer components such as web servers, network interfaces, security functions, load balancers, failover servers, management and network operations consoles, and the like are not shown so as to not obscure the details of the system architecture. Additionally, the system 130 may contain more, fewer, or different components than those shown in FIG. 2 and the functionality of the components as described herein may be distributed differently from the description herein.

The map data store 210 stores maps of geographic regions in which the system 130 generates routes, offers trip coordination services, and the like. The maps contain information about roads within the geographic regions. For the purposes of this disclosure, roads can include any route between two places that allows travel by foot, motor vehicle, bicycle or another form of travel. Examples of roads include streets, highways, freeways, trails, bridges, tunnels, toll roads, waterways, airways, or crossings. Roads may be restricted to certain users, or may be available for public use. Roads can connect to other roads at intersections. An intersection is a section of one or more roads that allows a user to travel from one road to another. Roads may be divided into road segments, where road segments are portions of roads that are uninterrupted by intersections with other roads. For example, a road segment would extend between two adjacent intersections on a surface street or between two adjacent entrances/exits on a highway.

The map data store 210 also includes map features, which may be stored in association with regions, road segments, and routes. Map features can include road features that describe characteristics of a map, such as placement of road signs, speed limits, road directionality (e.g., one-way, two-way), traffic history, traffic conditions, addresses on a road segment, lengths of road segments, and road segment type (e.g., surface street, residential, highway, toll). The map properties can also include features associated with intersections, such as road sign placement, the presence of traffic signals, turn restrictions, light timing information, throughput, and connecting road segments. In some embodiments, the map features also include properties describing the geographic region as a whole or portions of the geographic region, such as weather within the geographic region, geopolitical boundaries (e.g., city limits, county borders, state borders, country borders), and topological properties.

In some embodiments, the map data store 210 stores information about virtual delineations of regions (e.g., geofences). A geofence is a virtual perimeter geographically enclosing a portion of map data. Geofences are used to delineate specific geographic regions and may be applied for various reasons, such as categorization or alerts. In one embodiment, a large region is subdivided into many smaller regions using geofences, and data about map features is collected with respect to effects or presence within individual geofences. Geofences may be established along political boundaries (e.g., city borders), census tracts, neighborhood outlines, using arbitrary grid cells (e.g., an overlay of hexagons on a map), or as a group of grid cells selected based on one or more characteristics of the region corresponding to the cells.

The user profile store 220 stores information about users of the system 130 such as providers and riders. The information about users stored in the user profile store 220 may be anonymized. The user profile store 220 may store data and statistics about past trips a provider has taken, provider goals, and provider tendencies. For example, the user profile store 220 may include how long a provider has been providing trips for the system 130, provider ratings, data about past trips a provider has facilitated, an average number of trips provided per hour, vehicle type, usual hours of providing service, an average arrival time in relation to a predicted estimated time of arrival, whether the provider typically follows suggested routes, a weekly earnings goal the provider has set, geographical regions most frequently visited by the provider, an average amount of time the provider is willing to wait for a new assignment, and so forth.

Data about providers may be collected by the system 130, for example, via provider interactions with applications on a user device 100, and via rider feedback about the provider. User profile data may be used to determine a provider's probability of behaving in certain ways, for example, whether a provider is likely to follow a suggested route and whether a provider is likely to travel among different geographical regions, for example, when responding to a trip request from a rider.

The trip data store 230 stores data related to one or more past trips facilitated by the system 130. Trip data may include information about one or more of an origin and a destination of a trip, a route taken between the origin and the destination, a time of the trip, and an identification of the trip provider. The trip data may also include location information gathered by the location sensor on the user device 100 during the trip. Stored trip information can also include route features such as traffic signals and road signs, an estimated trip duration generated at the time a trip was requested, and an actual trip duration. In some embodiments, the trip data store 230 stores data related to trips taken by a provider that were not requested by a rider and that did not involve rider transport. For example, the system may suggest routes to a provider to encourage the provider to move toward an area of high demand (e.g., an area where many riders are requesting trips).

The trip monitoring module 240 receives data about trips as trips occur, which may include a provider's movement independent of transporting a rider. Trip data may include information about an origin location and destination, traffic conditions, whether the provider follows the suggested route, and feedback and incident reports submitted by riders or providers. Additionally, the trip monitoring module 240 may receive location sensor data from user devices 100 as trips occur. Location sensor data may include location coordinates, time stamps associated with the location coordinate data, and other information updated during the trip. Trip data collected by the trip monitoring module 240 is stored in the trip data store 230.

The routing module 250 receives from a user device 100 transport vehicle location and destination information associated with a current trip and generates a route from the current transport vehicle location to the destination. The route designates a path for the vehicle to follow to reach the destination, and may designate various road segments and transitions between road segments, such as turns, for the vehicle to execute. The routing module 250 can generate the optimized route based on a number of factors, including time of day, known traffic, closed roads or ongoing construction, intermediate destinations, and others. In one embodiment, the routing module 250 updates the route using the updated map matched location of the vehicle. As the vehicle travels, the vehicle reports its location with respect to the location sensor on the vehicle. The location may be matched to a road segment as a map matched location by the map matching module 260 as discussed below. The routing module 250 may generate an updated route based on the map matched location, thereby updating the route sent to the user device 100 to represents the current location of the transport vehicle and the path to the destination from the current location.

The map matching module 260 receives location sensor data associated with current or completed trips and generates a map matched trajectory based on the location sensor data. The location sensor data received by the map matching module 260 is data collected by the transport vehicle. For example, the map matching module 260 may receive GPS data collected during a trip. The map matched trajectory, or map matched route, represents a trajectory taken by the transport vehicle based on the location sensor data and map data stored in the map data store 210. The trajectory may be probabilistic, and represent the most-likely trajectory consistent with the location data associated with a trip. The map matching module 260 identifies candidate road segments corresponding to each received location data point and applies a forward probability algorithm to determine the probability of each candidate road segment being the actual vehicle location. In one embodiment, the algorithm used by the map matching module 260 is a Viterbi and forward probability algorithm of a Hidden Markov Model (HMM). In other embodiments, different or multiple algorithms may be used to generate a map matched route. In one embodiment, the map matching module 260 transmits the map matched route to the trip data store 210 to be stored in association with the trip.

Figure 5:
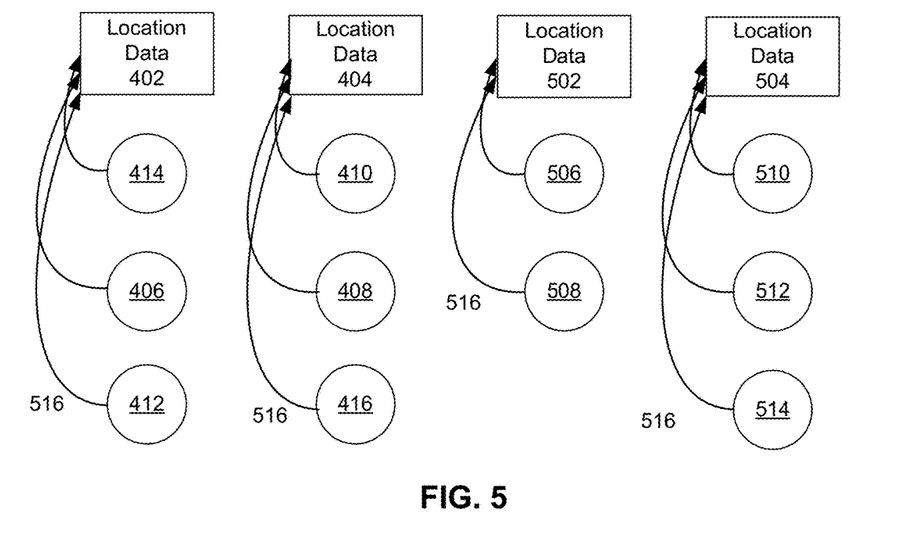
FIG. 5 is an example illustrating a mapping of location data points to candidate road segments to calculate an emission probability, in accordance with an embodiment.
Figure 6:
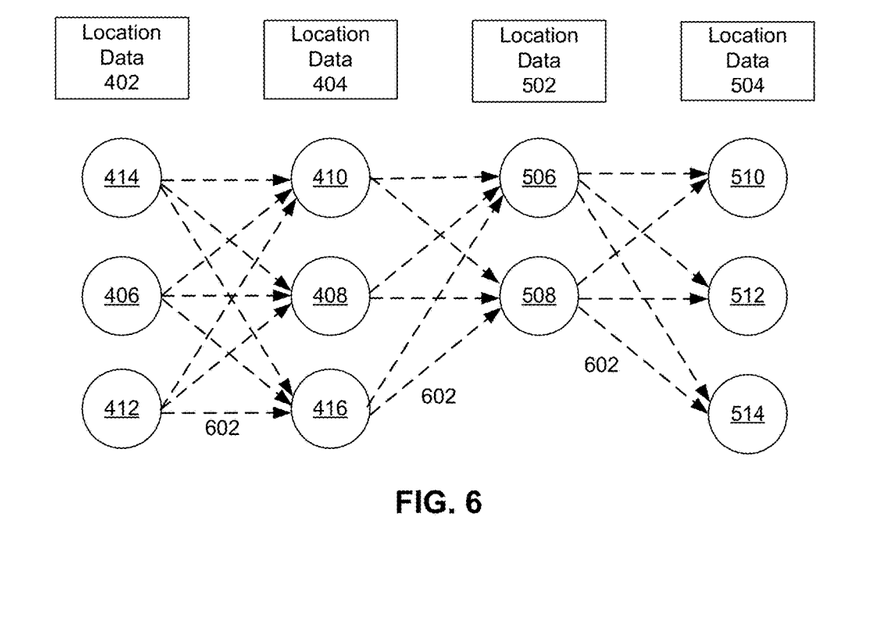
FIG. 6 is an example illustrating possible transitions between candidate road segments to calculate a transition probability, in accordance with an embodiment.

The matching metrics module 270 receives a map matched route from the map matching module 260 and applies the forward probability algorithm to determine an average forward probability and a number of zero forward probability points for the map matched route. The average forward probability and the number of zero forward probability points are used as a metric for the map matching process, and are used to evaluate the map matching algorithm used by the map matching module 260, the accuracy of the map data used in the map matching process, or other factors. In embodiments where multiple map matching algorithms are used to generate map matched routes for a single trip, the matching metrics module 270 may determine an average forward probability and a number of zero forward probability points for each map matched route. When the matching metrics perform poorly with respect to other map matching algorithms or different map data, alternate algorithms or map data may be evaluated and used when they score more highly. In addition, poor metrics may reflect map data errors and suggest areas in which the map data is erroneous. The identification of erroneous map data may be used to designate areas for further review (e.g., to dispatch an operator to identify correct map data for the area), designate areas to avoid, or designate an area for which to use alternate map data (e.g., to select map data from another map data provider). As discussed below, FIGS. 4, 5, and 6 illustrate an example in which the system 130 receives location data points, identify candidate road segments, and determines the average forward probability and number of zero forward probability points associated with the identified candidate road segments, which may be used to evaluate the map matching and underlying map data.

(b) Measuring the Accuracy of Map Matched Trajectories

Figure 3:
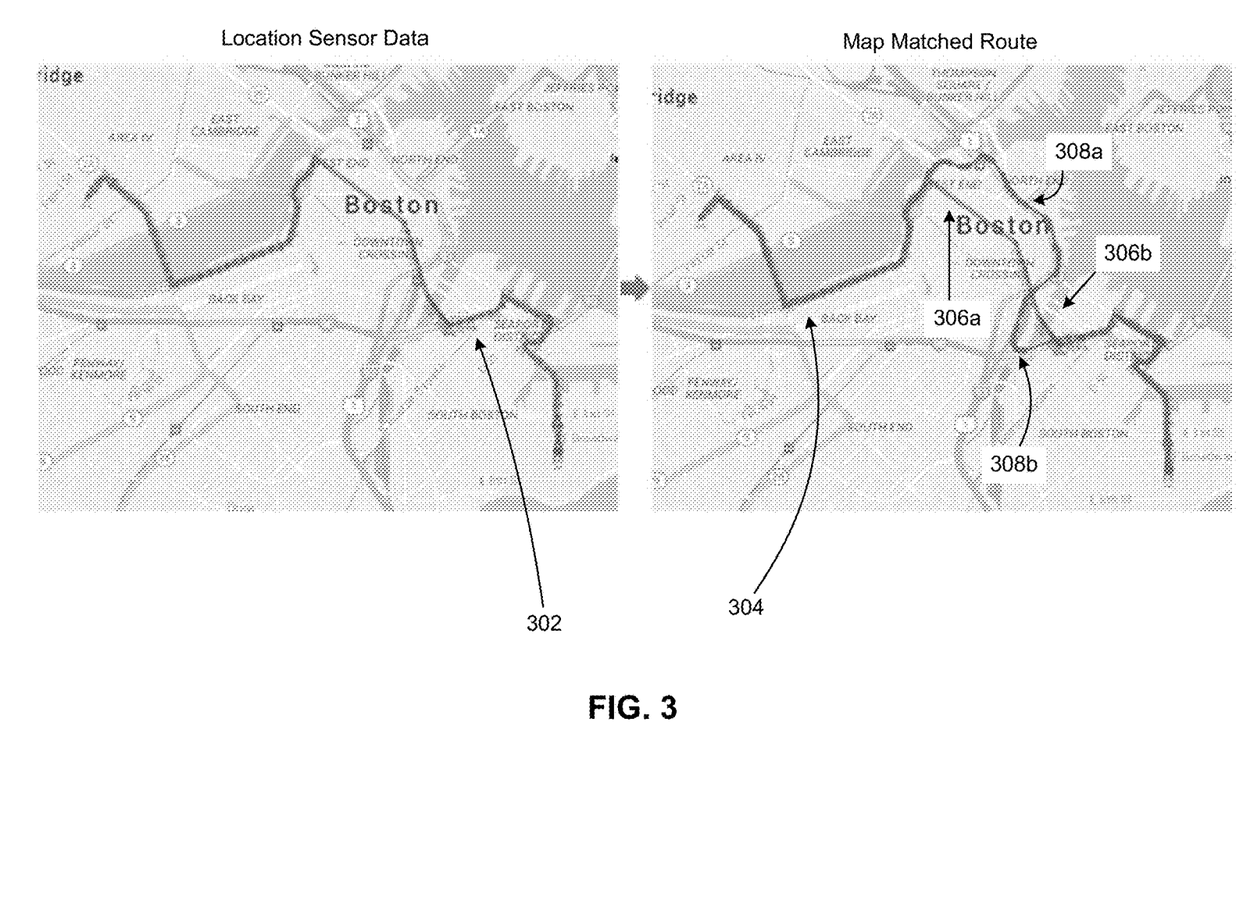
FIG. 3 is an example illustrating location data received on a trip and the corresponding map matched trajectory, in accordance with an embodiment.

FIG. 3 is an example illustrating location data received on a trip and the corresponding map matched trajectory. When the system receives location data associated with a trip, it uses the Viterbi algorithm to determine a map matched trajectory from the raw location data. The location sensor data received by the system 302 may contain errors due to interference from buildings, vehicles, weathers, and other circumstances which affect the precision of the location signals. This may result in a corresponding path that incorrectly identifies the road segments actually traveled by the transport vehicle, and thus impacts the transit information associated with the trip, such as the on-route distance of the trip or identifying the location of the vehicle for routing purposes. The system applies a Viterbi algorithm to determine the most likely map matched route. The predicted route represents the likely path actually traversed by the transport vehicle. FIG. 3 illustrates the predicted map matched route overlaid to the location sensor data 302. The map matched route can align closely to the location sensor data, as shown in segment 304. In other areas, the forward probability algorithm may show a significant deviation between the map matched results 308a, 308b and the location sensor data 306a, 306b, based on map data associated with the area. To evaluate how well the map matched route reflects the underlying location sensor data, metrics may be generated and evaluated for the trip to quantify how well the matched route (including the deviations 308a, 308b) likely reflects the location data. As one example, the system (e.g., matching metrics module 270) applies an unsupervised forward probability metric to assess the probability that the determined trajectory corresponds to the true path of the transport vehicle.

Figure 4:
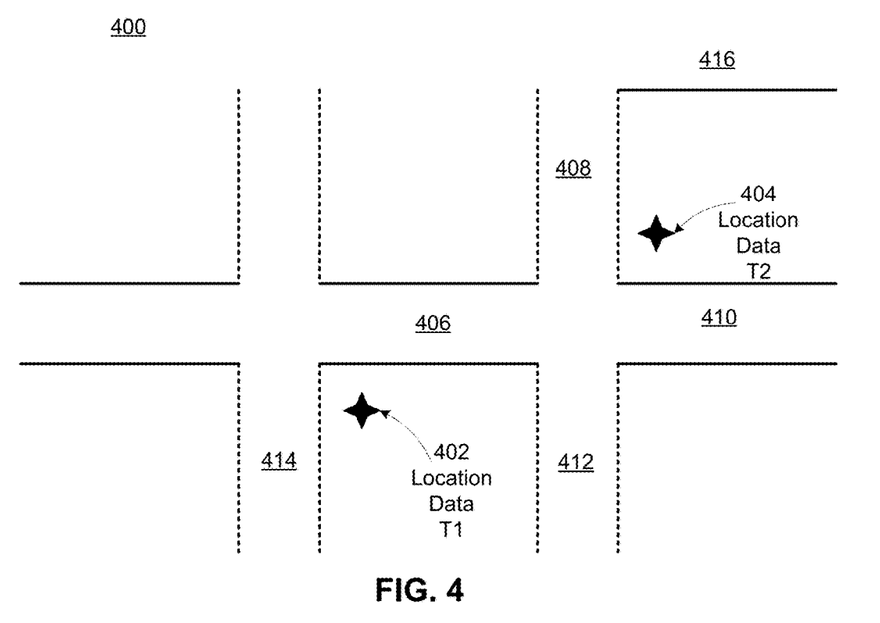
FIG. 4 is an example illustrating location data points and possible corresponding road segments on a map, in accordance with an embodiment.

FIG. 4 is example illustrating location data points received by the system 130 from a transport vehicle on a trip and corresponding candidate road segments on a map. The map matching module 260 receives location data 402 and 404 associated with points in time on a trip and applies a Viterbi algorithm to determine road segments on a map 400 to which they might correspond. Because the location sensor introduces some error due to interference, calibration, or other factors, the location sensor coordinates typically do not correspond exactly to a road segment. Thus, the Viterbi algorithm may consider road segments in an area, radius, or other region that do not correspond directly to the location data but may correspond to the actual location of the vehicle generating that location data. For example, the location data 402, 404 shown in FIG. 4 do not lie on road segments described by the underlying map. Therefore, for each location data point, the map matching module 260 identifies nearby road segments as candidates from which the location data point may have been generated. The first location data point 402 may correspond to road segments 406, 412, or 414. The second location data point 404 may correspond to road segments 408, 410, and 416. The system identifies up to a threshold number of possible road segments, based on the underlying map data, and may include the nearest N road segments, up to a maximum distance from the location data coordinate. To determine the probability that each road segment is the most likely trajectory of the transport vehicle, the Hidden Markov Model determines an emission probability and a transition probability associated with each road segment or set of road segments. Since the road segments are based on the underlying map data (e.g., in selecting road segments 406, 414, 412 for location data 402), low-scoring metrics generated by this process may represent that the underlying map data that provided these road segments as candidates may be erroneous or out of date.

FIG. 5 is an example illustrating a mapping of location data points to candidate road segments to calculate an emission probability. The emission probability is determined based on the probability that, for a given candidate road segment, the observed location signal would occur. As shown in FIG. 4, location data point 402 corresponds to three candidate road segments 414, 406, and 412. Similarly, location data point 404 corresponds to candidate roads 410, 408, and 416. Location data 502 and 504 represent additional data points not shown in FIG. 4. Location data point 502 corresponds to two candidate road segments 506 and 508, while location data point 504 corresponds to candidate road segments 510, 512, and 514. For each location data point and corresponding candidate road segment, the matching metrics module 270 calculates an emission probability 516.

To generate unsupervised metrics and automatically evaluate possible positions of the vehicle and possible transitions between then, the candidate road segments are evaluated with respect to the likelihood the location data was captured (an "emission") from a candidate road segment. A candidate road segment corresponds to a higher emission probability when the haversine distance from the candidate road to the observed location data point is smaller. The haversine distance measures a direct distance between two points on the surface of the earth. The haversine distance therefore may represent a distance between the road segment and observed location data as measured by a direct or absolute distance between the respective coordinates, without considering traversal of road segments or other obstacles. In other words, a higher emission probability reflects that the direct distance between an observed location data point and a candidate road is smaller. Thus, candidate roads that are closer to observed location data have a higher probability of accurately representing the true location of the transport vehicle. In one embodiment, the emission probability is further determined based on the assumption that location data received by the system 130 has Gaussian noise.

$$P(x_i \mid z_{i,j}) = \frac{1}{\sqrt{2\pi\alpha}} e^{-0.5*\left(\frac{\|x_i - z_{i,j}\|_{haversinedist}}{\alpha}\right)^2} \quad \text{Equation 1}$$

As one example shown in Equation 1, the emission probability 516 for the location data point $x_i$ for a given candidate road segment $z_{i,j}$ for that location data point is a probability $P(x_i \mid z_{i,j})$ computed as a function of the difference between the location data point and the candidate road segment. A haversine distance is calculated between the location data point $x_i$ and the given candidate road segment $z_{i,j}$ and modified by a normalizing constant $\alpha$. The constant $\alpha$ can represent and be adjusted to account for location sensor noise. A larger value of $\alpha$ corresponds to more noise in the location sensor data, while a smaller value of $\alpha$ corresponds to less noise in the location sensor data. The value of $\alpha$ is determined in one embodiment based on a calculated median absolute deviation of the sensor data from the true location. In one embodiment, $\alpha$ is 4.07. The modified haversine distance value is then converted using an exponential function and normalized to the emission probability.

FIG. 6 is an example illustrating possible transitions between candidate road segments to calculate a transition probability. The transition probability is determined based on the probability that, for a given pair of candidate road segments, the transport vehicle will move from the first candidate road segment to the next. This is calculated under the conditions that the transport vehicle cannot defy physics or break laws. The transition probability is modeled by the difference between the haversine distance of the location data and the routing distance corresponding to the map data. A transition between two candidate road segments that experience a similar haversine distance as the routing distance is associated with a higher probability of being the true trajectory of the transport vehicle.

As shown in FIG. 6, a transition probability 602 is calculated for each possible path between candidate road segments. As in FIGS. 4 and 5, each location data point is associated with a set of candidate road segments. Candidate road segments associated with location data with consecutive time stamps represent possible transitions between the candidate road segments during the time between readings of the location data from the location sensor. For example, the candidate road segment 414 corresponds to the location data point 402. A possible transition may occur from the road segment 414 to each of the candidate road segments corresponding to the next location data point 404. Therefore, a transition probability is calculated between road segments 414 and 410, 414 and 408, and 414 and 416.

$$P(z_{i,j} \mid z_{i-1,k}) = \frac{1}{\beta} e^{\frac{-d_i}{\beta}} \quad \text{Equation 2}$$

$$d_i = |\|x_i - x_{i+1}\|_{haversinedist} - \|z_{i,j} - z_{i+1,k*}\|_{route}|$$

As one example shown in Equation 2, the transition probability $P(z_{i,j}|z_{i-1,k})$ may be computed as a function of the absolute value of the difference between the haversine distance of the location data and the routing distance. The routing distance measures the distance between two candidate road segments as traversed by a vehicle. Therefore, the routing distance is calculated according to existent roads, traffic laws, and other obstacles. The distance between the first location data point $x_i$ and the second location data point $x_{i+1}$ is compared to the routing distance between the first candidate road segment $z_{i,j}$ and the second candidate road segment $z_{i+1,k*}$. Thus, a relatively lower difference between the haversine distance of the location data and the routing distance reflects that the routing path along a possible route transition more closely aligns with the distance reflected in the location data, and is therefore more likely to accurately represent the transition taken by the transport vehicle. This value is modified by a constant $\beta$, which can represent and be adjusted to account for the system tolerance to non-direct routes. A larger value of $\beta$ permits a greater tolerance to larger differences between the haversine distance and the routing distance, while a smaller value of $\beta$ reflects a lower tolerance to differences between the haversine and routing distances. In one embodiment, $\beta$ is 1. The modified value is then converted using an exponential function to the emission probability.

The probabilities determined in FIGS. 5 and 6 are then used to determine a forward probability associated with each road segment of the trip. Based on the map matched route and the associated forward probabilities of the road segments corresponding to the map matched route, the matching metrics module 270 determines an average forward probability for the trip and zero forward probability points, if they occur. The average forward probability and the zero forward probability count are used as a metric for the performance of the map matching process. A high average forward probability indicates a high likelihood of a map matched route correctly reflecting the true trajectory of a transport vehicle on a trip. A high number of zero forward probability occurrences indicates points at which the map matched route is highly improbable due to errors in the algorithm, in the location data, or in the map data. In some embodiments, a zero forward probability that occurs for a particular road segment over multiple trips may be used to indicate errors in the map data. Thus, the system 130 may use the forward probability algorithm as a metric for the quality of the map data associated with an area. As discussed above, the quality of the map data may be used to evaluate different map providers or identify erroneous or out of data map data for an area. The system 130 may also use the forward probability algorithm as a metric for the quality of the map matching algorithm used in the map matching module 260. Map matching algorithms that produce map matched routes corresponding to a higher average forward probability or fewer zero forward probability points may be more accurate and more often reflect the actual location of a vehicle on the map, improving automated routing.

Figure 7:
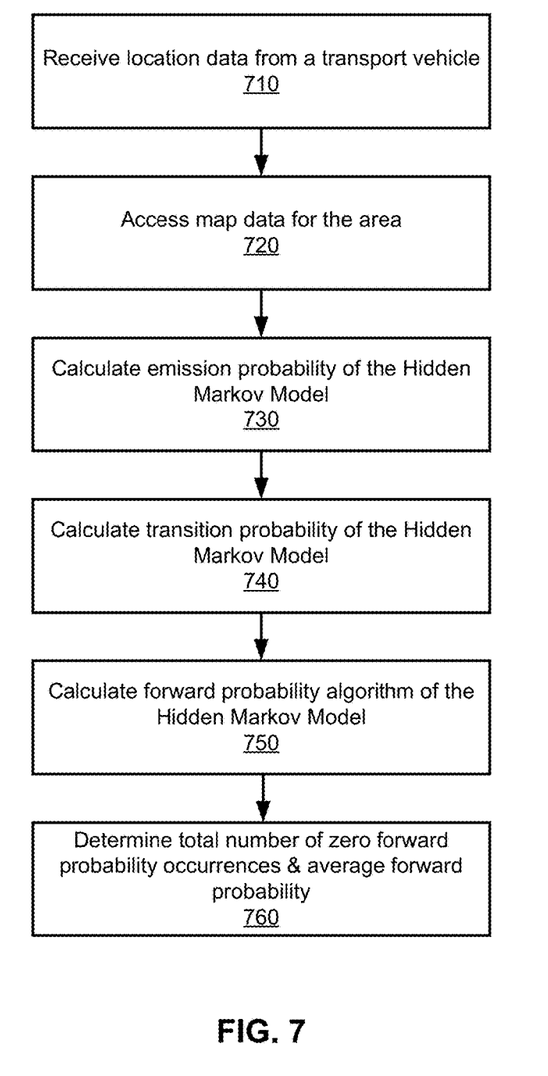
FIG. 7 is a flow diagram of a method for measuring the accuracy of a map matched trajectory, in accordance with an embodiment.

FIG. 7 is a flow diagram of a method for measuring the accuracy of a map matched trajectory. In various embodiments, the method may include different and/or additional steps than those described in conjunction with FIG. 7.

A transport service system 130 receives location data 710 from a transport vehicle. The location data is associated with a particular trip and timestamp. To accurately determine the trajectory of a particular trip for routing purposes, the location data is compared to a map matched trajectory considered to be the most likely path for the transport vehicle for the particular trip and ending location. The map matching module 260 accesses map data 720 of the geographic area corresponding to the trip, including information on road segments, locations, and transition points between road segments. The map data may further include information on local laws and events (e.g., speed limits, traffic, accidents) that may impact the routing of the transport vehicle for the trip.

The map matching module 260 applies the Viterbi algorithm and the forward probability algorithm to the received location data. The map matching module 260 calculates the emission probability 730 for each candidate road segment corresponding to a received location data point and the transition probability 740 for each pair of candidate road segments between two location data points. The emission and transition probabilities are then used to determine the joint probability 750 that the emission and transition probabilities occur.

The matching metrics module 270 determines the total number of zero forward probability occurrences and the average forward probability 760 during the map matched trajectory associated with the trip. The zero forward probability occurrences and average forward probability are then used as metrics for the map matching process. A map matched trajectory corresponding to a high average forward probability and a low number of zero forward probability occurrences may be considered more likely to be accurate to the true trajectory of the transport vehicle.

In another embodiment, a transport vehicle is equipped with a high precision location sensor. The system 130 thus receives high precision location data, which is used as the ground truth for a given trip. The ground truth may be used in direct comparison to the map matched trajectory as a supervised metric of the map matching process, allowing the system 130 to determine errors in the map matched trajectory based on points at which the map matched trajectory deviates from the ground truth location data. The supervised metric may be applied as a trip-based metric or as a point-based metric. A trip-based metric may quantify the route adherence of a map matched route, while a point-based metric may quantify the map matching error associated with a map matched route.

Route adherence measures the geometric similarity between the ground truth trajectory and the map matched route. The system 130 converts the ground truth trajectory and the map matched route into route polylines. Route polylines are generated as a series of nodes and connecting lines, wherein nodes may be added or collapsed to regulate the distance between nodes. In one embodiment, nodes are added or collapsed such that a node exists on the map for each 5-20 meters traversed by the transport vehicle.

For each of the map matched nodes, the system 130 calculates the distance between the map matched node and the polyline for the ground truth, which may be calculated with respect to nodes of the ground truth polyline, or with respect to a nearest line segment of the polyline, and determines if the calculated distance is below a threshold distance. The threshold distance is selected as a value at which the map matched node and the ground truth node are considered to represent the same route. Based on whether the calculated distance is below the threshold distance, the system 130 generates a binary value to represent whether the map matched node corresponds to the trajectory represented by the ground truth polyline, and accumulates the generated values for each map matched node. This value is then divided by the total number of generated nodes along the generated polyline, producing a route adherence value from 0 to 1. Values closer to 1 indicate that the map matched route adheres closely to the ground truth route, while values closer to 0 indicate that the map matched route deviates from the ground truth route.

As another supervised metric, a map matching error measures, for segments of a traveled route, whether the map matched route deviates in length over portions of the route and over- or under-reports distances of the route. For a geometric length of the ground truth route, the system 130 identifies whether the geometric length of the corresponding section of the map matched route indicates a greater or shorter length. The system 130 sums the magnitudes of these errors across each segment of the route and divides by the total length of the route. This produces an error value, wherein a value closer to zero represents a trip for which the distances of each segment of the route closely align to distances reported by the ground truth route, while a value closer to one represents a trip for which the distances of each segment of the route deviate from those reported by the ground truth route.

In one embodiment, the supervised metric may be used in conjunction with the unsupervised forward probability algorithm metric to further evaluate and improve the map matching process. For example, the supervised metric may be compared to the results of the unsupervised metric for a trip. A map matched result closely aligned to the high precision location data route should result in the forward probability algorithm used by the unsupervised metric computing a high average forward probability and few zero forward probability points. In another example, locations frequently tagged as zero forward probability points by the unsupervised forward probability metric may be used to identify areas in which a vehicle with high precision location capabilities should be dispatched to ensure that the associated map data is correct.

(c) Example Computer System

Figure 8:
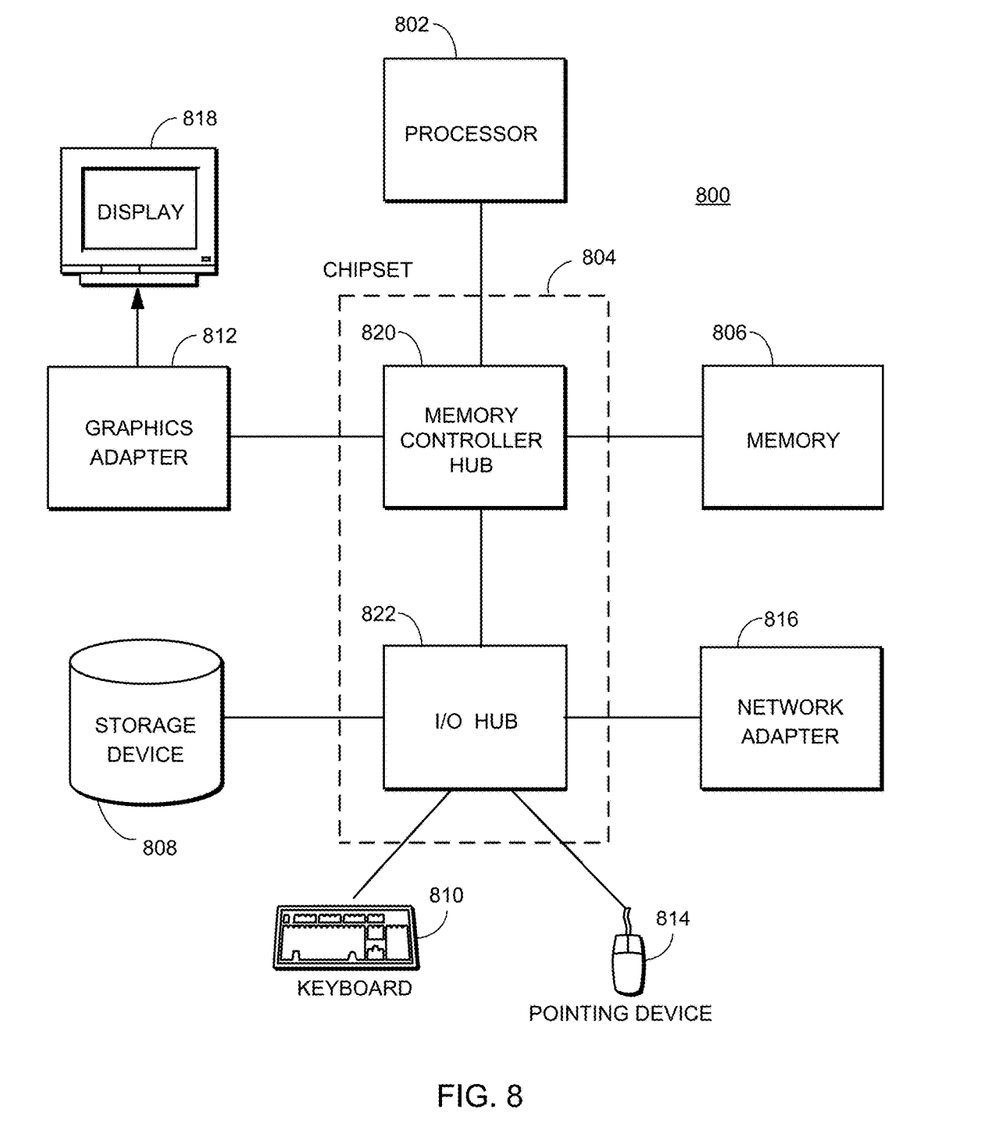
FIG. 8 is a high-level block diagram illustrating physical components of a computer used as part or all of one or more of the entities described herein in one embodiment.

FIG. 8 is a high-level block diagram illustrating physical components of a computer 800 used as part or all of one or more of the computing systems described herein in one embodiment. For example, instances of the illustrated computer/800 may be used as a server operating the system 130. Illustrated are at least one processor 802 coupled to a chipset 804. Also coupled to the chipset 804 are a memory 806, a storage device 808, a keyboard 810, a graphics adapter 812, a pointing device 814, and a network adapter 816. A display 818 is coupled to the graphics adapter 812. In one embodiment, the functionality of the chipset 804 is provided by a memory controller hub 820 and an I/O hub 822. In another embodiment, the memory 806 is coupled directly to the processor 802 instead of the chipset 804. In one embodiment, one or more sound devices (e.g., a loudspeaker, audio driver, etc.) is coupled to chipset 804.

The storage device 808 is any non-transitory computer-readable storage medium, such as a hard drive, compact disk read-only memory (CD-ROM), DVD, or a solid-state memory device. The memory 806 holds instructions and data used by the processor 802. The pointing device 814 may be a mouse, track ball, or other type of pointing device, and is used in combination with the keyboard 810 to input data into the computer 800. The graphics adapter 812 displays images and other information on the display 818. The network adapter 816 couples the computer system 800 to a local or wide area network.

As is known in the art, a computer 800 can have different and/or other components than those shown in FIG. 8. In addition, the computer 800 can lack certain illustrated components. In one embodiment, a computer 800 acting as a server may lack a keyboard 810, pointing device 814, graphics adapter 812, and/or display 818. Moreover, the storage device 808 can be local and/or remote from the computer 800 (such as embodied within a storage area network (SAN)).

As is known in the art, the computer 800 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 808, loaded into the memory 806, and executed by the processor 802.

(d) Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving from a transport service vehicle raw location data, the location data associated with a timestamp and a trip;
   receiving from a transport service system a map of an area associated with the transport service vehicle and the trip, the map containing information on viable trajectories for the transport service vehicle;
   calculating with a Hidden Markov Model an emission probability, the emission probability based on the likelihood that the transport service vehicle is at a road segment given an observation of the location data at a candidate road;
   calculating with a Hidden Markov Model a transition probability, the transition probability based on the likelihood that for a current state, the transport service vehicle will transition to a next state; and
   based on the joint probability of the emission and transition probabilities, determining a total number of zero forward probability occurrences and an average forward probability associated with the trip.

2. The method of claim 1, wherein the total number of zero forward probability occurrences and the average forward probability associated with a trip is used to evaluate the accuracy of a map matched trajectory associated with the trip.

3. The method of claim 1, wherein the total number of zero forward probability occurrences and the average forward probability of one or more trips associated with a given area are used to evaluate the accuracy of the map associated with a map matching process in the area.

4. The method of claim 1, wherein the emission probability is directly related to the haversine distance from a given GPS data point and a candidate road.

5. The method of claim 1, wherein the transition probability is modeled by the difference between the haversine distance between the current state and the next state and a routing distance between a road segment candidate of the current state and a road segment candidate of the next state.

6. The method of claim 1, further comprising:
   receiving high precision location data from a transport vehicle equipped with a high precision location tracking device;
   comparing a high precision location data route corresponding to the high precision location data to a map matched route associated with the trip;
   based on discrepancies between the high precision location data route and the map matched route associated with the trip, identifying errors in the map matched route;
   combining the average forward probability and zero forward probability occurrences with the identified errors as a metric for the accuracy of the map matched route.

7. A non-transitory computer-readable storage medium storing computer program instructions executable by a processor to perform operations comprising:
   receiving from a transport service vehicle raw location data, the location data associated with a timestamp and a trip;
   receiving from a transport service system a map of an area associated with the transport service vehicle and the trip, the map containing information on viable trajectories for the transport service vehicle;
   calculating with a Hidden Markov Model an emission probability, the emission probability based on the likelihood that the transport service vehicle is at a road segment given an observation of the location data at a candidate road;
   calculating with a Hidden Markov Model a transition probability, the transition probability based on the likelihood that for a current state, the transport service vehicle will transition to a next state; and
   based on the joint probability of the emission and transition probabilities, determining a total number of zero forward probability occurrences and an average forward probability associated with the trip.

8. The computer-readable storage medium of claim 7, wherein the total number of zero forward probability occurrences and the average forward probability associated with a trip is used to evaluate the accuracy of a map matched trajectory associated with the trip.

9. The computer-readable storage medium of claim 7, wherein the total number of zero forward probability occurrences and the average forward probability of one or more trips associated with a given area are used to evaluate the accuracy of the map associated with a map matching process in the area.

10. The computer-readable storage medium of claim 7, wherein the emission probability is directly related to the haversine distance from a given GPS data point and a candidate road.

11. The computer-readable storage medium of claim 7, wherein the transition probability is modeled by the difference between the haversine distance between the current state and the next state and a routing distance between a road segment candidate of the current state and a road segment candidate of the next state.

12. The computer-readable storage medium of claim 7, further comprising:
  receiving high precision location data from a transport vehicle equipped with a high precision location tracking device;
  comparing a high precision location data route corresponding to the high precision location data to a map matched route associated with the trip;
  based on discrepancies between the high precision location data route and the map matched route associated with the trip, identifying errors in the map matched route;
  combining the average forward probability and zero forward probability occurrences with the identified errors as a metric for the accuracy of the map matched route.

13. A system comprising:
  a computer processor for executing computer program instructions; and
  a non-transitory computer-readable storage medium storing computer program instructions executable by the processor to perform operations comprising:
    receiving from a transport service vehicle raw location data, the location data associated with a timestamp and a trip;
    receiving from a transport service system a map of an area associated with the transport service vehicle and the trip, the map containing information on viable trajectories for the transport service vehicle;
    calculating with a Hidden Markov Model an emission probability, the emission probability based on the likelihood that the transport service vehicle is at a road segment given an observation of the location data at a candidate road;
    calculating with a Hidden Markov Model a transition probability, the transition probability based on the likelihood that for a current state, the transport service vehicle will transition to a next state; and
    based on the joint probability of the emission and transition probabilities, determining a total number of zero forward probability occurrences and an average forward probability associated with the trip.

14. The system of claim 13, wherein the total number of zero forward probability occurrences and the average forward probability associated with a trip is used to evaluate the accuracy of a map matched trajectory associated with the trip.

15. The system of claim 13, wherein the total number of zero forward probability occurrences and the average forward probability of one or more trips associated with a given area are used to evaluate the accuracy of the map associated with a map matching process in the area.

16. The system of claim 13, wherein the emission probability is directly related to the haversine distance from a given GPS data point and a candidate road.

17. The system of claim 13, wherein the transition probability is modeled by the difference between the haversine distance between the haversine distance between the current state and the next state and a routing distance between a road segment candidate of the current state and a road segment candidate of the next state.

18. The system of claim 13, further comprising:
  receiving high precision location data from a transport vehicle equipped with a high precision location tracking device;
  comparing a high precision location data route corresponding to the high precision location data to a map matched route associated with the trip;
  based on discrepancies between the high precision location data route and the map matched route associated with the trip, identifying errors in the map matched route;
  combining the average forward probability and zero forward probability occurrences with the identified errors as a metric for the accuracy of the map matched route.

* * * * *